S. M. King,
Drag Saw.

N° 29,384.    Patented July 31, 1860.

Witnesses:

Inventor:
Saml. M. King
by atty Chas. G. Page

UNITED STATES PATENT OFFICE.

SAMUEL M. KING, OF LANCASTER, PENNSYLVANIA.

STEAM CROSSCUT-SAWING MACHINE.

Specification of Letters Patent No. 29,384, dated July 31, 1860.

*To all whom it may concern:*

Be it known that I, SAMUEL M. KING, of Lancaster, in the county of Lancaster and State of Pennsylvania, have invented an Improvement in Portable Steam Crosscut-Sawing Machines, and that the following is a full, clear, and exact description of the principle or character which distinguishes it from all other things before known and of the usual manner of making, modifying, and using the same, reference being had to the accompanying drawings, of which—

Figure 2:
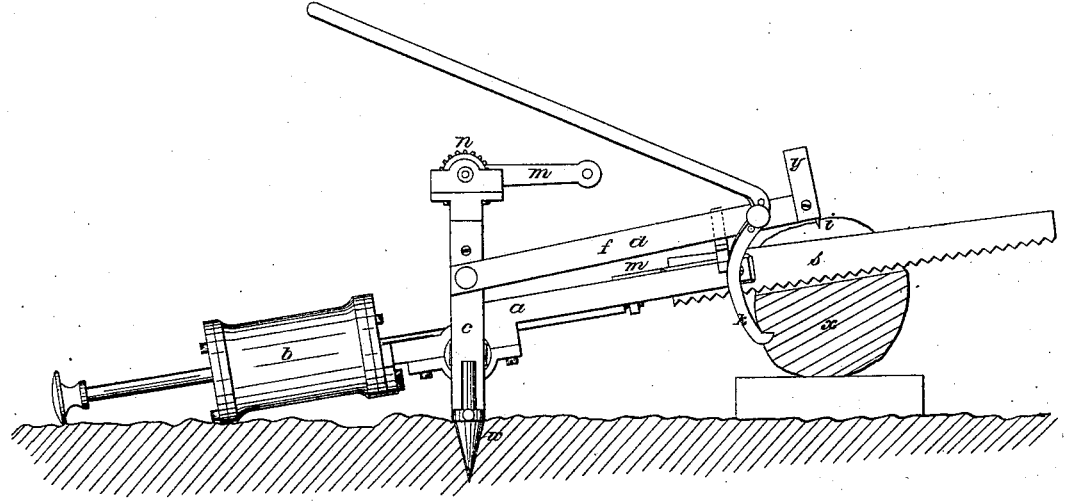
Figure 1:
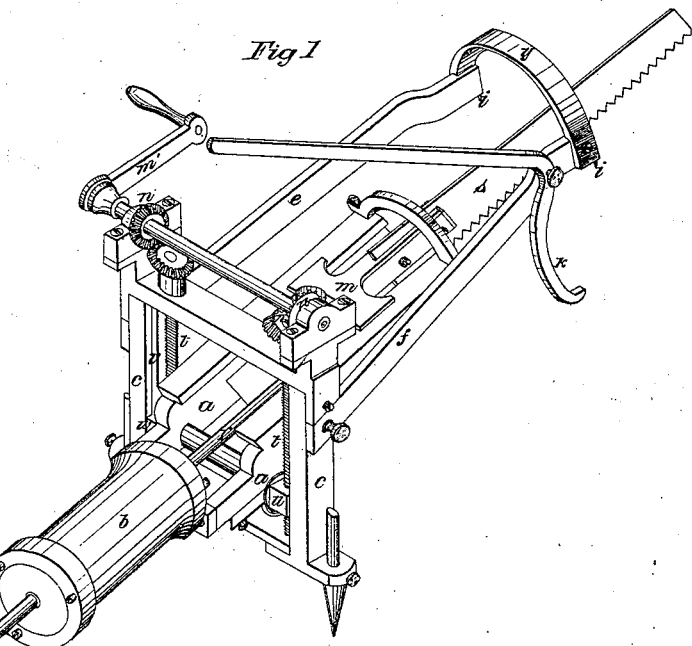

Figure 1 is a perspective view of the machine, Fig. 2 a side elevation of the same.

My invention consists in certain improvements in steam cross-cut sawing machines described as follows: $b$ is the steam cylinder attached to the guide frame $a$. The piston rod $r$ is connected directly with the cross head $m$ of the saw $s$, this cross head working on the guide frame in the usual manner. This guide frame is pivoted to the two uprights $c, c$, at a point intermediate between the steam cylinder and cross head of the saw, so as nearly to balance the cylinder and saw, which gives important advantages in raising the saw and in raising the whole frame to move it about. The feed is regulated by the crank $m'$ and gears $n$ operating upon the screws $t, t$, which pass through the projections $u$ on the guide frame which slide up and down in the grooves $v$, in the uprights $c, c$. The cylinder preponderating during the whole of the sawing rests upon the ground and the uprights being provided with two strong and sharp pointed feet $w$ which are to be driven firmly into the ground, and thus the whole frame work is firmly supported and by the most simple construction. These screws are in the vertical plane of the axis of suspension of the guide bars, and this arrangement adds much to the simplicity and efficiency of the machine. The mode of dogging and holding the log is also simple and efficient and contributes to the support of the uprights $c, c$, as follows: The frame $d$ consists of the two arms $e, f$, bearing the yoke $y$, dog $k$, and pins $i, i$. The arms are fastened firmly to the uprights $c, c$, and the pins being driven down into the log $x$ the dog $k$ is inserted as shown in Fig. 2 upon the inside of the log instead of reaching to the outside as is generally the case in machines for sawing logs. This arrangement of the frame points and dog, secures the log firmly and expeditiously, and contributes to the steadiness of the whole machine.

It will be noticed that although the guide frame is nearly balanced by its mode of suspension yet the feeding is assisted by nearly the whole weight of the frame, saw, and cylinder.

What I claim as my invention and improvement in portable cross cut sawing machines is,

1. Pivoting the guide frame $a$, which bears the steam cylinder $b$ and the cross head of the saw, at a point intermediate between the steam cylinder and the cross head of the saw.

2. In combination with such mode of pivoting the frame arranging the feed movement so that it shall operate at the point of suspension of frame $a$, as set forth.

3. Supporting the steam cylinder and the entire frame work upon the two uprights $c, c$, as set forth.

SAML. M. KING.

Witnesses:
CHAS. A. PAGE,
WM. H. HARRISON.